United States Patent [19]

Ehrhart et al.

[11] 4,418,517
[45] Dec. 6, 1983

[54] ACTUATING MECHANISM FOR HARVESTER TRANSPORT LOCK

[75] Inventors: Philip J. Ehrhart, Narvon; James T. Donovan, Gordonville; E. Graham Webster, New Holland, all of Pa.

[73] Assignee: Sperry Corporation, New Holland, Pa.

[21] Appl. No.: 369,947

[22] Filed: Apr. 19, 1982

[51] Int. Cl.³ ............................................ A01B 73/00
[52] U.S. Cl. ...................................... 56/228; 56/15.5; 172/679; 280/462
[58] Field of Search ................ 56/15.8, 228; 280/462, 280/463, 467, 468; 172/245, 625, 679

[56] References Cited

U.S. PATENT DOCUMENTS

| | | |
|---|---|---|
| 3,751,071 | 8/1973 | Patterson et al. ................... 172/679 |
| 3,832,837 | 9/1974 | Burkhart et al. ...................... 56/228 |
| 3,919,831 | 11/1975 | Halls et al. ............................ 56/228 |
| 3,993,206 | 11/1976 | Jomen et al. ......................... 280/468 |
| 4,037,395 | 7/1977 | Henkensiefken ..................... 56/228 |
| 4,081,946 | 4/1978 | Ehrhart ................................ 56/15.8 |

Primary Examiner—Paul J. Hirsch

Attorney, Agent, or Firm—Larry W. Miller; Frank A. Seemar; Darrell F. Marquette

[57] ABSTRACT

An actuating mechanism for the transport lock on a crop harvesting machine having a pivotally movable tongue mounted to the frame of the harvesting machine, commonly referred to as a pivot-tongue windrower, is disclosed wherein a first spring is compressible to exert a biasing force on a locking pin to urge the pin through suitable aligned apertures in the base of the tongue and in the frame of the machine to automatically extend the locking pin through the apertures when they become aligned due to manipulation of the pivotal movement of the tongue by the operator at a location remote from the locking pin. A second spring is compressible to exert a biasing force on the locking pin to urge the locking pin into an unlocked position, withdrawn from the hole in the frame, so that the tongue is free to pivotally move relative to the frame. The second spring is operable to automatically compress the first spring when the locking pin is moved to the unlocked position. Accordingly, the actuating mechanism is operable to bias the locking pin in either a locked or an unlocked position.

11 Claims, 7 Drawing Figures

ACTUATING MECHANISM FOR HARVESTER TRANSPORT LOCK

BACKGROUND OF THE INVENTION

The present invention relates generally to crop harvesting machines, commonly referred to as pivot-tongue harvesters, and, more particularly, to an actuating mechanism for automatically moving a locking pin between locked and unlocked position.

Pivot-tongue harvesting machines, such as the windrower depicted in U.S. Pat No. 3,832,837, have been developed to enable the operator to swing the harvester from a transport position rearwardly of the tractor to an outwardly operating position by manipulation of the position of the tongue relative to the frame of the machine. Pivot-tongue windrowers having the pivotable tongue mounted near the center of the harvester, such as seen in U.S. Pat. No. 4,081,946, can be used to harvest crop to either side of the tractor, as well as be transported in a position directly rearwardly of the tractor. Locking devices have been used to lock the harvester in its transport position when being transported from one job location to another.

One such locking device is a pin inserted through appropriately aligned holes in the movable tongue and the stationary frame. This locking pin would then prevent the tongud from moving relative to the frame and, therefore, lock the machine in its transport position. As can be seen in the aforementioned U.S. Pat. No. 4,081,946, the position of the tongue or draw bar relative to the frame is controlled through manipulation of a hydraulic cylinder operatively interconnecting the tongue and the frame; however, because of the desire to control the operating position of the harvester during operation thereof, the controls for the manipulation of the hydraulic cylinder are generally located on the tractor.

Since the two holes corresponding to the tongue and the frame, respectively, must be aligned before the locking pin can be inserted, the procedure for locking the harvester in its transport position can be both frustrating and time-consuming if undertaken by only one person, due to the numerous trips between the tractor and the rear of the harvester that may be necessary to assure proper alignment of the holes. Conversely, the withdrawal of the locking pin also requires proper alignment of the corresponding holes, as a slight misalignment may bind the locking pin and make withdrawal thereof difficult.

Accordingly, it would be desirable to provide an actuating mechanism that would be operable to automatically insert or withdraw the locking pin through the corresponding holes when they become aligned while the operator is at the tractor operating the controls to manipulate the hydraulic cylinder and, thereby, aligning the holes.

SUMMARY OF THE INVENTION

It is an object of this invention to overcome the aforementioned disadvantages of the prior art by providing a transport lock actuator that is operable to automatically insert or withdraw a locking pin through a pair of alignable holes when they become aligned.

It is another object of this invention to provide a transport lock actuator that is operable to both lock and unlock the transport position of a harvester.

It is an advantage of this invention that an operator can actuate the transport lock of a pivot-tongue harvester from his tractor by manipulation of the hydraulic cylinder to pivot the tongue relative to the frame of the machine without making repeated trips to the harvester to determine if the holes are aligned.

It is a feature of this invention that the transport lock actuating mechanism is simple and economical in design and construction.

It is still another object of this invention to utilize a first spring to bias the locking pin in its locked position and a second spring to bias the locking pin in its unlocked position.

It is a further object of this invention to enable the second spring to automatically compress the first spring whenever the second spring moves the locking pin into the unlocked position.

It is another feature of this invention that the locking pin is automatically biased toward the locked position when in the unlocked position.

It is another advantage of this invention that the locking pin will move toward its locked position if one or more components in the actuating mechanism fail to function properly.

It is yet a further object of this invention to provide a transport locking pin actuator which is durable in construction, inexpensive of manufacture, carefree of maintenance, facile in assemblage and simple and effective in use.

These and other objects, features and advantages are accomplished according to the instant invention by providing an actuating mechanism for the transport lock on a crop harvesting machine having a pivotally movable tongue mounted to the frame of the harvesting machine, wherein a first spring is compressible to exert a biasing force on a locking pin to urge the pin through suitably aligned apertures in the base of the tongue and in the frame of the machine to automatically extend the locking pin through the apertures when they become aligned due to manipulation of the pivotal movement of the tongue by the operator at a location remote from the locking pin. A second spring is compressible to exert a biasing force on the locking pin to urge the locking pin into an unlocked position, withdrawn from the hole in the frame, so that the tongue is free to pivotally move relative to the frame. The second spring is operable to automatically compress the first spring when the locking pin is moved to the unlocked position. Accordingly, the actuating mechanism is operable to bias the locking pin in either a locked or an unlocked position.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
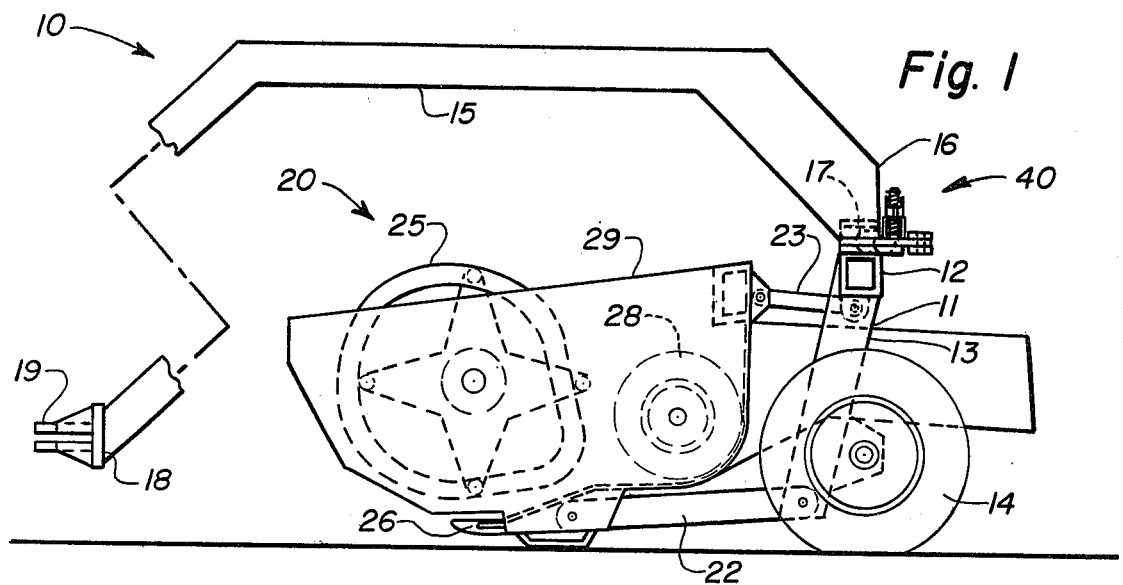
FIG. 1 is a side-elevational view of a crop harvesting machine, commonly referred to as a pivot-tongue hay harvester, incorporating the principles of the instant invention.
Figure 2:
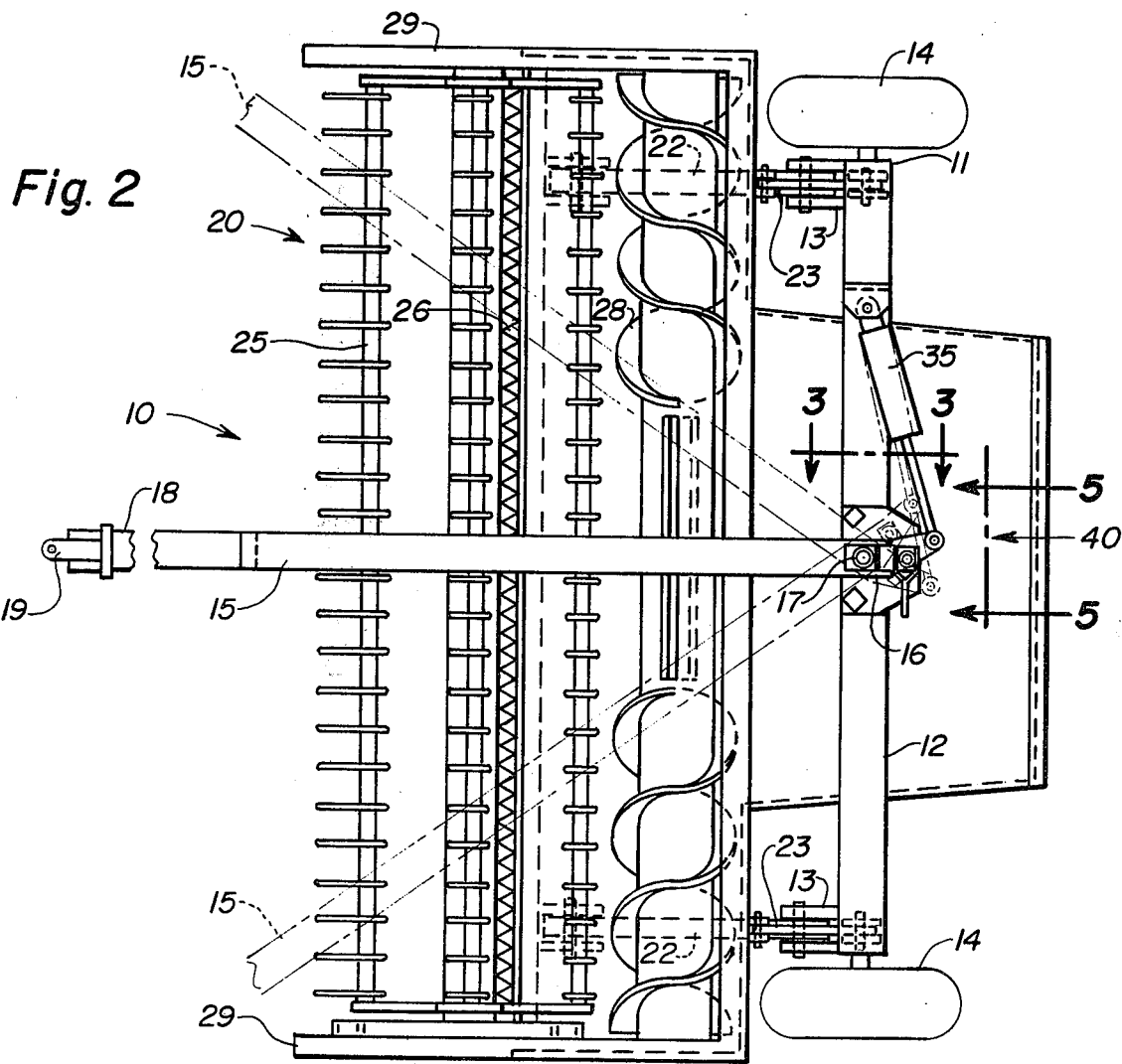
FIG. 2 is a top-plan view of the crop harvesting machine seen in FIG. 1, the extreme operating positions of the pivotally mounted tongue being shown in phantom.

Referring now to the drawings and, particularly, to FIGS. 1 and 2, a side-elevational view and a top-plan view of a crop harvesting machine, commonly referred to as a pivot-tongue hay harvester, can be seen. Any left or right references are used as a matter of convenience and are determined by standing at the rear of the machine facing the forward end, the direction of travel.

The pivot-tongue windrower 10 is of the type described in U.S. Pat. No. 4,081,946, issued to Philip J. Ehrhart on Apr. 4, 1978. The windrower 10 includes a generally U-shaped frame 11 having a transverse beam member 12 and downwardly depending leg members 13 onto which wheels 14 are mounted. An arched tongue 15 is pivotally connected at its rearward end 16 to the frame 11 by a generally vertically aligned pivot axis 17, such that the tongue 15 is pivotally movable in a transverse direction from left to right. The arched tongue 15 projects forwardly from the frame 11 over top of the header 20 and terminates at its forward end 18 in a clevis 19 or other connector which is adapted for connection to a source of motive power, such as a tractor.

The header 20 is pivotally connected to the frame 11 by a pair of lower links 22 and at least one upper link 23 so that the header 20 is free to move in a generally vertical direction relative to the frame 11 through the use of a header lift mechanism, not shown. The header 20 includes a reel 25 rotatably mounted between a pair of opposing sidesheets 29. A cutterbar 26 mounted between the sidesheets 29 below the reel 25 is operable to sever standing crop material. Harvesting machines such as the windrower 10 typically have a conditioning mechanism, not shown, which can be mounted between the depending leg members 13 of the frame 11. If the width of the conditioning mechanism is less than the width of the header, as defined by the distance between the opposing sidesheets 29, a crop consolidating mechanism such as the auger 28 is generally provided to consolidate the severed crop and discharge it to the conditioning mechanism. The operation of the header 20 in harvesting standing crop is well known in the art and will not be discussed further.

Figure 3:
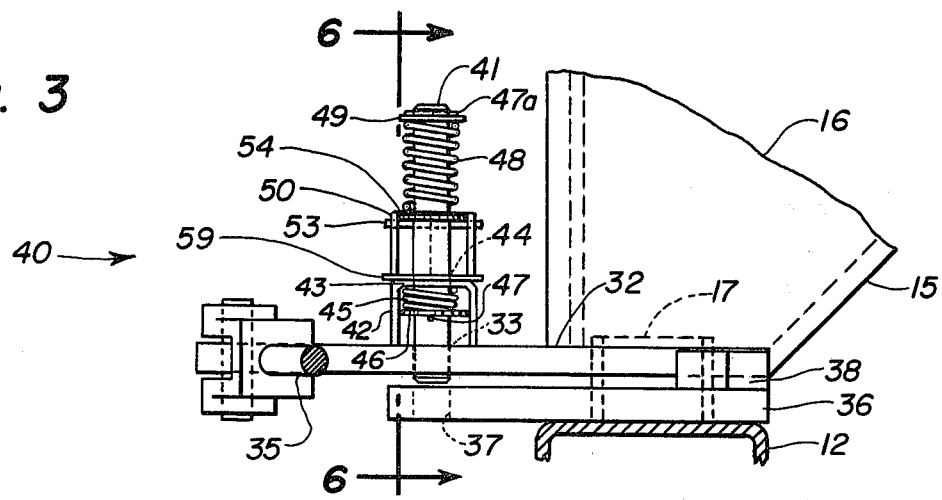
FIG. 3 is an enlarged side-elevational view of the actuating mechanism corresponding to lines 3—3 of FIG. 2.
Figure 4:
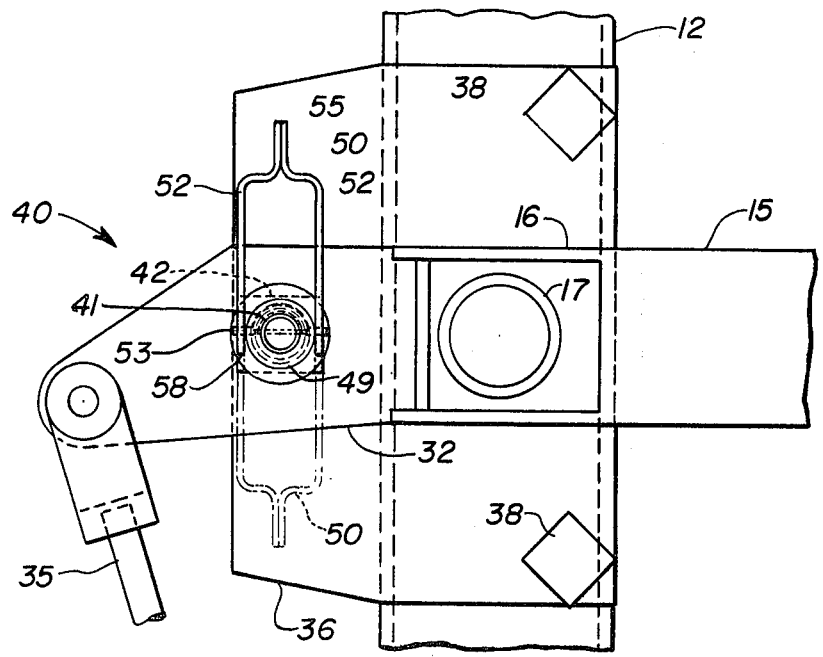
FIG. 4 is a top-plan view of the actuating mechanism seen in FIG. 3, the position of the actuating lever to bias the locking pin in the locked position being shown in phantom.
Figure 5:
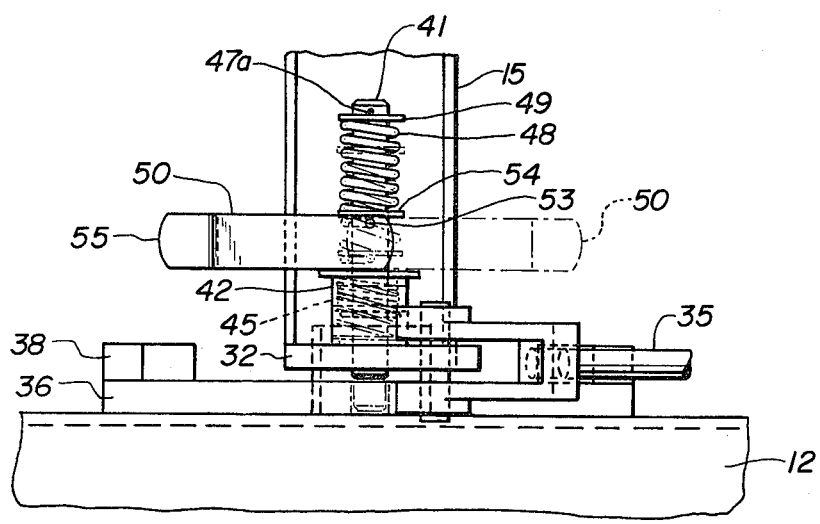
FIG. 5 is a rear-elevational view of the actuating mechanism seen in FIG. 2 and corresponding to lines 5—5, the locked position of the actuating mechanism being shown in phantom.

Referring now to FIGS. 3, 4 and 5, an enlarged view of the rearward end 16 of the arched tongue 15 can be seen. A base plate 32 is affixed to the rearward end 16 of the tongue 15 to be pivotable therewith relative to the frame 11 about the vertical pivot 17. A hydraulic cylinder 35 interconnecting the base plate 32 and the upper transverse beam 12 of the frame 11, as best seen in FIG. 2, provides a source of power for pivotally moving the arched tongue 15 about the pivot 17. A frame plate 36, corresponding to the base plate 32, is affixed to the upper transverse beam 12 such that the base plate 32 is movable relative thereto and immediately thereabove. The frame plate 36 includes stops 38 to limit the amount of pivotal movement of the arched tongue 15 in both the left and right directions. The center position, seen in FIG. 4 in solid lines, is the transport position for a windrower 10 having its arched tongue 15 mounted near the center of the transverse beam 12. When the arched tongue 15 is in this transport position, a hole 33 in the base plate 32 is aligned with a corresponding hole 37 in the frame plate 36 to provide the capability of locking the pivotable tongue 15 in the transport position.

A transport lock actuating mechanism 40, using a locking pin 41 insertable through the holes 33 and 37 when aligned, is provided to lock the arched tongue 15 in its transport position. The locking pin 41 is slidably received within a generally U-shaped housing 42 affixed to the base plate 32 such that the locking pin 41 is positioned within the hole 33. The locking pin 41 projects upwardly through a hole 44 in the bight portion 43 of the housing 42.

A first spring 45 is concentrically mounted on the locking pin 41 between the bight portion 43 of the housing 42 and the base plate 32. A washer 46 is also concentrically mounted on the locking pin 41 below the first spring 45 for sliding movement along the locking pin 41. A stop 47 in the form of a pin inserted through the locking pin 41, limits the movement of the washer 46 and the first spring 45 downwardly along the locking pin 41. A second spring 48 and a second washer 49 above the spring 48 is also concentrically mounted on the locking pin 41 above the bight portion 43 of the housing 42 for sliding movement relative to the locking pin 41. A stop 47a, in the form of a pin inserted through the top of the locking pin 41, limits the movement of the washer 49 and the second spring 48 upwardly along the locking pin 41.

Figure 6:
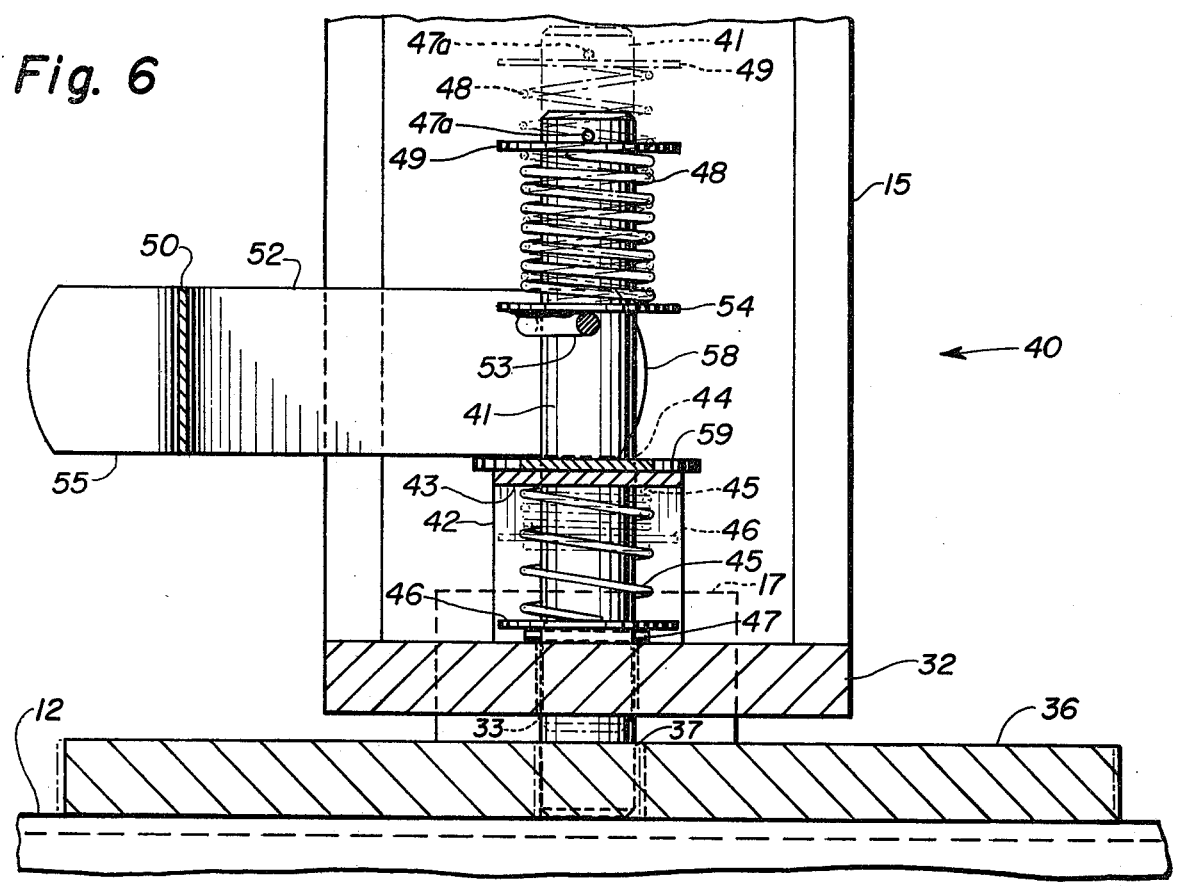
FIG. 6 is an enlarged cross-sectional view of the actuating mechanism taken along lines 6—6 of FIG. 3, the solid lines showing the position of the actuating mechanism to bias the locking pin toward the unlocked position, shown in phantom.
Figure 7:
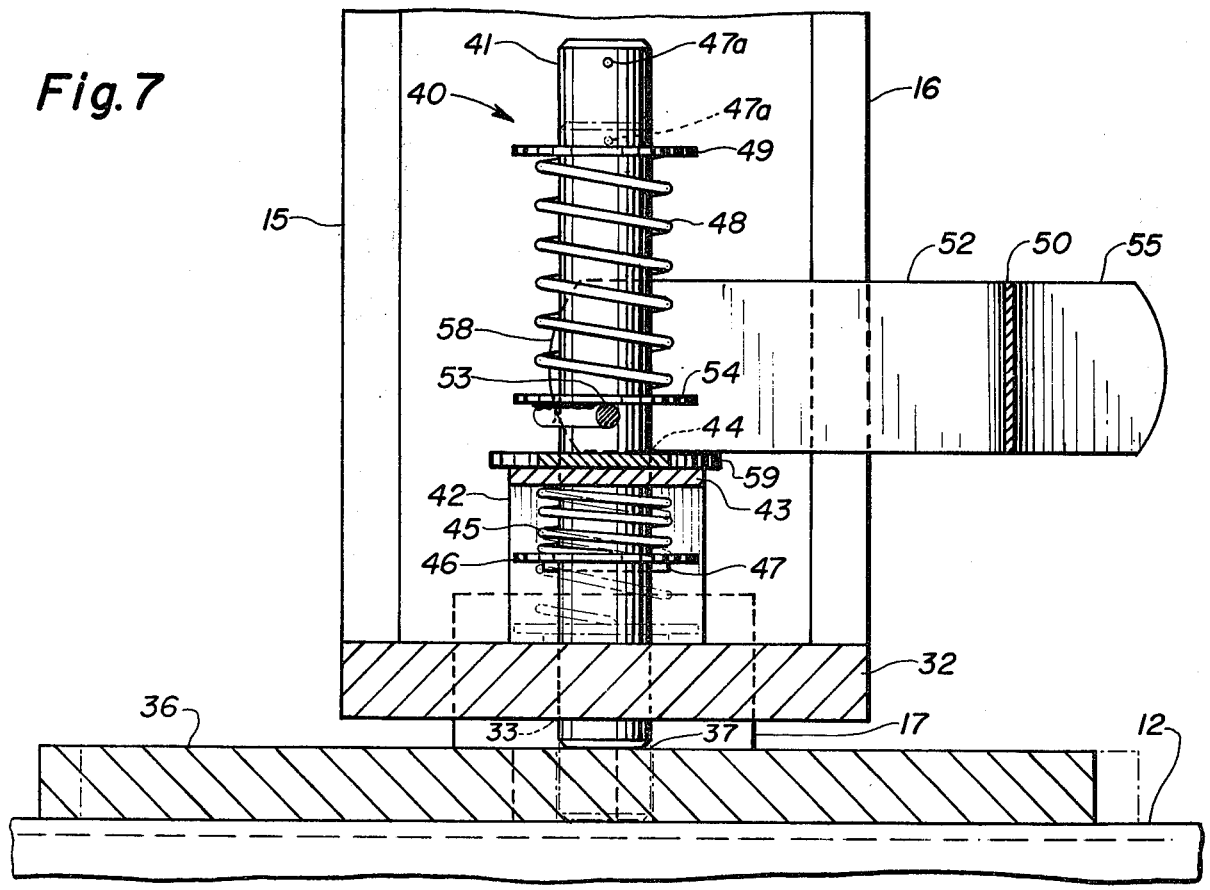
FIG. 7 is an enlarged cross-sectional view of the actuating mechanism taken along lines 6—6 of FIG. 3, the solid lines indicating the unlocked position of the actuating mechanism with the locking pin being biased toward the locked position, the locked position of the actuating mechanism being shown in phantom.

An actuating lever 50 is comprised of a pair of spaced-apart members 52 pivotally connected by pivot 53, offset from the centerline of the lever 50, to a washer 54 concentrically mounted on the locking pin 41 for sliding movement relative thereto below the second spring 48. Because of the offset position of the pivot 53, the lever 50 can be positioned with the pivot 53 adjacent the housing 42, as seen in FIG. 7, or with the pivot 53 spaced from the housing 42, as seen in FIG. 6. The spaced-apart members 52 converge into a handle 55 spaced from the pivot 53. The distance between the pivot 53 and the handle 55 is sufficient to permit the handle 55 to pass over top of the locking pin 41 during the pivotable movement of the actuating lever 50. The spaced-apart members 52 terminate in a curved camming surface 58 that is engageable with a support member 59 mounted to the bight portion 43 of the housing 42 to effect a compression of the second spring 48, as will be described in detail below.

Referring now to FIGS. 3-7, the operation of the actuating mechanism 40 to move the locking pin 41 between a locked or transport position, wherein the locking pin 41 is inserted through both holes 33 and 37 in the base plate 32 and the frame plate 36, respectively, thereby preventing any relative movement between the tongue 15 and the frame 11, and an unlocked or operating position, wherein the locking pin 41 is retracted from the hole 37 in the frame plate 36 to permit relative movement between the base plate 32 and the frame plate 36 to allow the tongue 15 to pivotally move relative to the frame 11.

The solid lines in FIG. 3 indicate the unlocked or operating position of the locking pin 41. The actuating lever 50 is positioned with the pivot 53 spaced from the support member 59, thereby keeping the second spring 48 spaced from the housing 42. The second spring 48 is in a partially compressed state, while the first spring 45 is in a compressed state, due to the locking pin 41 being in the unlocked position, as will be described in further detail below. Becuase the partially compressed second spring 48 is stronger than the more fully compressed first spring 45, the locking pin 41 remains in its unlocked position with the first spring 45 being held in a compressed state to exert a biasing force to urge the locking pin 41 toward its locked position.

A movement of the actuating lever 50 from the position seen in solid lines in FIGS. 4 and 5 to the position shown in phantom, moves the pivot 53 to a position adjacent the support member 59, permitting the second spring 48 to relax and slide downwardly along the locking pin 41 to a position closer to the bight portion 43 of the housing 42, as seen in solid lines in FIG. 7. Once the actuating lever 50 is moved to the position seen in FIG. 7, the second spring 48 no longer overpowers the first spring 45; however, the locking pin 41 will remain in its unlocked position until the holes 33 and 37 in the base plate 32 and the frame plate 36, respectively, become aligned. After the holes 33 and 37 become aligned, the biasing force exerted by the compressed first spring 45 moves the locking pin 41 into its locked or transport position.

As can be seen by one skilled in the art, when the operator of the windrower 10 desires to lock the machine in its transport position, he need only flip the actuating lever 50 into the position as seen in FIG. 7 and return to the tractor to actuate the hydraulic cylinder 35 and move the tongue 15 relative to the frame 11 until the holes 33, 37 become aligned. The actuating mechanism 40 will then automatically move the locking pin 41 into its locked position, thereby preventing the tongue 15 from moving relative to the frame 11.

To move the locking pin 41 from its locked position to its unlocked position, the operator need only move the actuating lever 50 from the position seen in FIG. 7 to the position seen in FIG. 6. The camming surface 58 at the end of the spaced-apart members 52 engages the support member 59 and shifts the pivot 53 to a position spaced from the support member 59. If the holes 33, 37 are slightly misaligned, thereby binding the locking pin 41, the washer 49 will engage the upper pin stop 47a and serve to compress the secons spring 48, as seen in solid lines in FIG. 6. The compressed second spring 48 will exert a biasing force on the locking pin 41 to urge it toward its unlocked position. Manipulation of the hydraulic cylinder 35 to move the base plate 32 relative to the frame plate 36 and more perfectly align the holes 33, 37 will free the locking pin 41 for vertical movement. At this point, the biasing force exerted by the compressed second spring 48 will move the locking pin 41 into its unlocked or operating position, automatically compressing the first spring 45.

As can be seen in FIGS. 6 and 7, the lower pin stop 47 is positioned along the locking pin 41 relative to the first spring 45 such that when the locking pin 41 moves from its locked position to its unlocked position, the washer 46 compresses the first spring 45 against the bight portion 43 of the housing 42. Since the first spring 45 is compressed whenever the locking pin 41 is in its unlocked position, there is always a biasing force urging the locking pin 41 toward its locked position. Accordingly, a failure of the second spring 48 or the actuating lever 50 could permit the first spring 45 to move the locking pin 41 into its locked position.

It will be understood that various changes in the details, materials, steps and arrangement of parts which have been described and illustrated to explain the nature of the invention, will occur to may be made by those skilled in the art upon a reading of the disclosure within the principles and scope of the invention. The foregoing description illustrates preferred embodiments of the invention. However, concepts, as based upon such description, may be employed in other embodiments without department from the scope of the invention. Accordingly, the following claims are intended to protect the invention broadly as well as in the specific form shown herein.

Having thus described the invention, what is claimed is:

1. A transport lock actuating mechanism for a crop harvesting machine having a mobile frame, said frame having a first aperture therethrough, harvesting apparatus operatively supported on said frame for the harvesting of crop material, a tongue having a first end pivotally connected to said frame and a remote second end adapted for connection to a primary mover, a base member affixed to the first end of said tongue to be pivotally movable therewith and having a second aperture therethrough alignable with said first aperture, and power means interconnecting said tongue and said frame for pivoting said tongue relative to said frame, in combination comprising:

(a) a housing mounted on said base member and movable therewith;

(b) a locking pin slidably received within said housing for insertion through said second aperture, said locking pin including first and second spaced-apart spring retention members, said locking pin being movable between a locked position in which said locking pin extends through both said first and second apertures such that said base member is not free to move relative to said frame and an unlocked position in which said locking pin does not extend through both said first and second apertures and said base member is free to move with said tongue relative to said frame;

(c) a first spring concentrically mounted on said locking pin adjacent said first spring retention member;

(d) a second spring concentrically mounted on said locking pin adjacent said second spring retention member;

(e) first and second separably movable compression means for compressing said first spring against said first retention member and for compressing said second spring against said second retention member, respectively, such that said locking pin is biased toward said locked position when said first spring is compressed and biased toward said unlocked position when said second spring is compressed.

2. The actuating mechanism of claim 1 wherein said second compression means includes a lever engagable with said second spring and cooperable with said second retention member to compress said second spring and maintain said second spring in a compressed state until said first and second apertures are aligned so that said locking pin can move to said unlocked position due to the biasing force exerted by said second spring, said lever including a spring engaging member for engaging said second spring.

3. The actuating mechanism of claim 2 wherein said lever includes a camming surface engagable with said housing to position said lever to compress said second spring when said lever is moved from a non-compressing position.

4. The actuating mechanism of claim 3 wherein said lever prevents said first spring from moving said locking pin into said locked position under conditions where said locking pin is in said unlocked position, said first spring is compressed to exert a biasing force to urge said locking pin toward said locked position and said lever is in said compressing position.

5. The actuating mechanism of claim 2 or 4 wherein said second spring has a higher spring rate than said first spring.

6. The actuating mechanism of claim 5 wherein said second spring is operable to automatically compress said first spring when said second spring moves said locking pin to said unlocked position, said first compression means being said first spring retention member compressing said first spring against said housing by the movement of said locking pin into its unlocked position.

7. The actuating mechanism of claim 6 wherein said lever includes a pair of spaced-apart arms having opposing side edges and being pivotally connected to said spring engaging member, said lever pivotally moving between said compressing and non-compressing positions, said pivotal connection of said spaced-apart arms with said spring engagement member being closer to one of said side edges than the other, such that when said lever is in said compressing position said pivot is spaced further from said housing than when said lever is in said non-compressing position.

8. The actuating mechanism of claim 7 wherein said housing is a U-shaped member having two spaced-apart, vertically inclined legs affixed to said base member on opposite sides of said locking pin and a bight portion spaced from said base member and interconnecting said vertical legs, said bight portion having a hole therein for slidably receiving said locking pin, said first spring being disposed between said base member and said bight portion, said first spring being compressible against said bight portion.

9. The actuating mechanism of claim 8 wherein said first spring retention member is connected to said locking pin between said first spring and said base member, such that when said locking pin moves upwardly into said unlocked position, said first retention member compresses said first spring against said bight portion of said housing.

10. The actuating mechanism of claim 9 wherein said first and second spring retention members are washers concentrically mounted on said locking pin and respectively engagable with pins inserted through said locking pin.

11. The actuating mechanism of claim 7 wherein said spring engaging member comprises a washer concentrically mounted on said locking pin between said lever and said second spring, said washer being slidable relative to said locking pin and having said pivot affixed thereto.

* * * * *